United States Patent [19]

Iguchi et al.

[11] Patent Number: 4,704,083

[45] Date of Patent: Nov. 3, 1987

[54] T-DIES ADAPTED FOR EXTRUSION MOLDING

[75] Inventors: Katsuhiko Iguchi, Susono; Satoru Nitta; Hidemi Wada, both of Numazu; Takayoshi Sano, Fuji, all of Japan

[73] Assignee: Toshiba Kikai Kabushiki Kaisha, Tokyo, Japan

[21] Appl. No.: 874,484

[22] Filed: Jun. 16, 1986

[30] Foreign Application Priority Data

Jun. 19, 1985 [JP] Japan ................................ 60-133275
Jun. 19, 1985 [JP] Japan ................................ 60-133276

[51] Int. Cl.$^4$ ............................................. B29C 47/16
[52] U.S. Cl. ................... 425/466; 264/177.1; 425/141
[58] Field of Search ............ 264/40.5, 177.1, 177.11; 425/131.1, 133.5, 141, 376 R, 376 A, 381, 461, 466

[56] References Cited

U.S. PATENT DOCUMENTS

| 3,461,501 | 8/1969 | Stewart | 425/466 |
| 4,507,073 | 3/1985 | Shelton | 425/466 |
| 4,514,348 | 4/1985 | Iguchi et al. | 425/466 |

FOREIGN PATENT DOCUMENTS

| 2305877 | 8/1973 | Fed. Rep. of Germany | 425/466 |
| 2450662 | 5/1975 | Fed. Rep. of Germany | 425/466 |
| 46-9670 | 3/1971 | Japan | 425/466 |
| 47-40284 | 10/1972 | Japan | 425/466 |
| 59-182713 | 10/1984 | Japan | 425/466 |

Primary Examiner—Jay H. Woo
Assistant Examiner—J. Fortenberry
Attorney, Agent, or Firm—Stevens, Davis, Miller & Mosher

[57] ABSTRACT

A T-die adapted for extrusion molding of a plastic material such as plastic film is constituted by a lower stationary half and an upper movable half. The stationary half is integrally provided with a steady lip portion and a movable half is provided with a base portion and flexible lip portion so as to form a gap in slit form between the steady and flexible lip portions. The gap is adjusted partially by a plurality of adjusting bolts screwed to the upper portion of the movable half extending to cover the flexible lip portion with space, the bolts being arranged in a line along the longitudinal direction of the T-die and spaced equally with each other. Each bolt has such a length that the front end thereof downwardly presses the flexible lip portion when the bolt is driven downwardly. The flexible lip portion is provided with a plurality of U-shaped grooves each disposed between the adjacent two bolts and having a width of an opening substantially equal to the distance between the adjacent two bolts. The operation continuity and the flexibility of the flexible lip portion can be improved by the depth of the groove in accordance with the cross sectional shape thereof.

2 Claims, 12 Drawing Figures

T-DIES ADAPTED FOR EXTRUSION MOLDING

BACKGROUND OF THE INVENTION

This invention relates to a T-die adapted for an extrusion molding of a plastic material such as plastic film.

FIG. 1 shows a part of a conventional bending lip type of a T-die which comprises a lower stationary part S and an upper movable part M. The lower part S is provided with a steady lip portion 1 and the upper movable part M is provided with a flexible lip portion 4 and a base or neck portion 7, and a gap 2 of an elongated slit form is formed between the lower and upper lip portions 1 and 4. A plurality of die bolts 3 (3a, 3b, 3c, . . . ) are provided, usually screwed, for the upper projecting portion of the movable part of the T-die along the longitudinal direction thereof with equal spaces therebetween so that the die bolts 3 abut against and press downwardly the flexible lip portion 4 when the bolts 3 are driven downwardly.

According to the adjustment of the bolted amounts of the bolts 3 mutually or independently in a manual or automatical manner, the base portion 7 of the upper movable part M is bent or displaced to thereby obtain a desired thickness of the gap 2 of the elongated lip slit through which a plastic material is extruded. With the T-die having a construction described above, however, even when one specific bolt among the plural bolts 3 is adjusted to adjust only a specific portion of the gap 2, the influence of the adjustment of the specific bolt occurs to portions other than the specific portion which is to be really adjusted, particularly to the portions adjacent to the specific portion by the so-called mutual interference effect.

A graph of FIG. 2 represents deformed or displaced amounts $\delta$ of the flexible lip portion 4 of the T-die at portions of the flexible lip portion 4 corresponding to the locations of eight bolts 3a, 3b, . . . 3h and curves I, II and III represent mutual interference effects of the bolts 3 when the first, second and third bolts 3a, 3b and 3c are respectively bolted to downwardly press the corresponding portions of the flexible lip portion 4. As is apparent from FIG. 2, the adjustment of one bolt affects a considerably wide area of the flexible lip portion 4, i.e. thickness of the lip gap 2.

Although this deformation or displacement of the flexible lip portion 4 of the T-die does not provide very severe problems for the formation of usual non-elongated sheets or films of and the adjustment of the flow distribution of melted material passing through the lip gap, this displacement of the lip portion of the T-die will have relatively severe effects in specific cases as follows:

(a) In a case where it is required to adjust and control the edge profile of an original sheet adapted for a biaxially elongated film.

(b) In a case where it is required to measure a position of a die-bolt for adjusting or changing the flow amount of a film passing through a specific portion of the flexible lip in use of a thickness gauge.

(c) In a case where it is required to precisely or minutely adjust fine unevenness of a profile of a film passing through the flexible lip.

In order to obviate the problems or defects described before and to make it possible to deal with the above-described specific cases, the prior art provides an improved T-die such as shown in FIG. 3. The flexible lip portion 4 of the movable part M of the T-die shown in FIG. 3 is provided with a plurality of slits or narrow grooves 6 between the respective adjacent bolts 3 (3a, 3b, . . . 3h) to form a thin thickness portions of the flexible lip 4 to thereby weak the mutual interference effect of the bolts 3 when they are driven. The displacement amount $\delta$ of the lip portion according to the construction with the slits is represented by graphs shown in FIG. 4 with curves I, II and III under the same condition as that of the case shown in FIG. 2. These curves I, II and III show that a influence of the specific one bolt which is actually driven is transferred to a lesser degree than that in the case of the T-die shown in FIG. 1, particularly to the bolts 3e, 3f, 3g and 3h in the illustrated example.

As can be understood from the foregoing description, with the T-die adapted for an extrusion molding, the following two factors have to be always considered, one being continuity regarding the deformation or displacement of the flexible lip portion and the heat distribution, and the other being operation freedom or flexibility for operating the respective bolts with less interference effects between themselves.

It will easily be understood that the T-die having the construction illustrated in FIG. 1 which has a flexible lip portion provided with no groove has the best continuity, and regarding operation flexibility, the T-die shown in FIG. 1 is the worst. On the other hand, although not described in the drawings, a T-die of the type having divided lip portions corresponding to the respective adjusting bolts has the best operation flexibility and the worst continuity. Taking the above facts into consideration, it will be considered that the total characteristics of the T-die including the continuity and the operation flexibility are to be judged totally by taking into consideration the depth of the groove or slit formed in the flexible lip portion 4 of the T-die and the width of the individual groove or slit.

On this point, in a test performed with respect to the lip deformation or displacement profile, a curve VI in use of the T-die shown in FIG. 3 provided with narrow slits 6 represents a discontinuous pattern apart from a curve V regarding one relatively ideal continuous pattern in use of the T-die shown in FIG. 1. As understood from the above fact, in the prior art, although the mutual interference effect between the adjusting bolts 3 is weakened by providing narrow slits 6 for the flexible lip portion 4 of the movable part of the T-die, detailed analysis of the depth and the width of the slit 6 is not mentioned at all, which is very significant for the operational characteristics of a T-die of the type described hereinbefore.

SUMMARY OF THE INVENTION

An object of this invention is to eliminate defects or disadvantages encountered with the prior art and described hereinbefore and to provide a T-die adapted for extrusion molding provided with a flexible lip portion to which a plurality of grooves are formed for improving the total characteristics regarding the continuity and the operation flexibility of the lip portion.

Another object of this invention is to provide T-dies provided with grooves of various shapes of the flexible lip portions, the grooves being characterized in their depths and widths for improving the operational characteristics of the T-dies.

These and other objects can be achieved, according to this invention, by providing a T-die adapted for an extrusion molding of a plastic material constituted by a lower stationary half and an upper movable half provided with a base portion, the T-die comprising a steady lip member integrally formed with the stationary half, a flexible lip member formed integrally with the base portion of the movable half so as to protrude therefrom to form a gap in slit form between the steady and flexible lip members, a projecting member formed integrally with an upper portion of the movable half so as to extend above the flexible lip member with a space, and a plurality of adjusting bolts secured, usually screwed, at one ends to the projecting member and spaced equally along the longitudinal direction of the T-die, each of the adjusting bolts having such a length that the other end of the adjusting bolt reaches the upper portion of the flexible lip member and presses the same downwardly when the bolt is screwed downwardly, the flexible lip member being provided with a plurality of U-shaped grooves each disposed between the adjacent two bolts and each having a width of an opening substantially equal to a distance between the adjacent two bolts. In more detailed embodiments of this invention, the ratio $h_2/h_1$ (in which $h_1$ is the height of the flexible lip member and $h_2$ is the distance between the base portion and the bottom of the groove) is specifically ranged in accordance with the cross sectional shapes of the grooves provided for the flexible lip member.

DESCRIPTION OF THE PREFERRED EMBODIMENT

Figure 1:
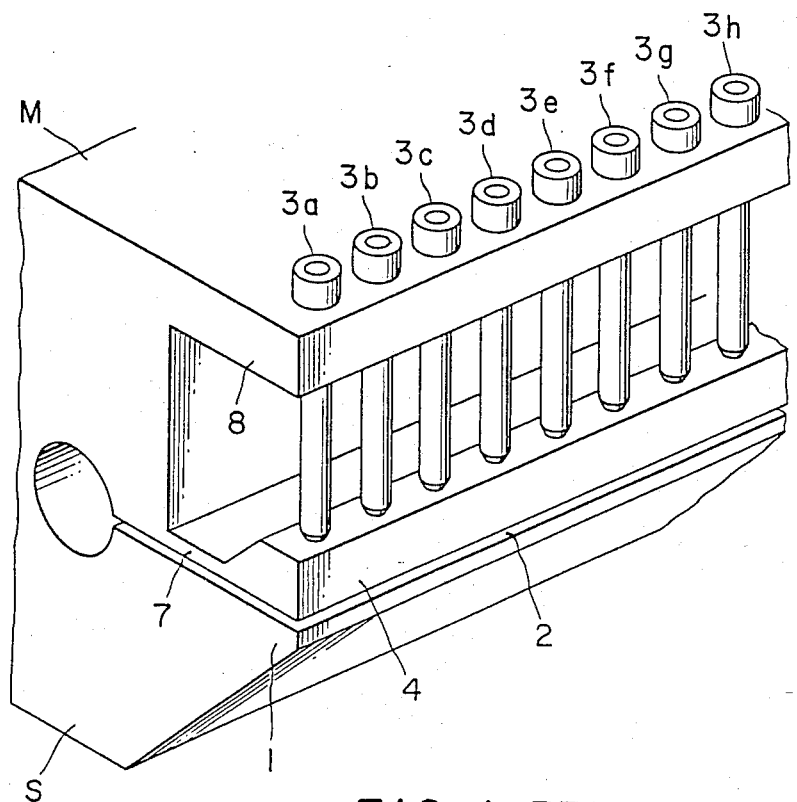
FIG. 1 is a perspective view of a part of a conventional T-die adapted for extrusion molding.
Figure 2:
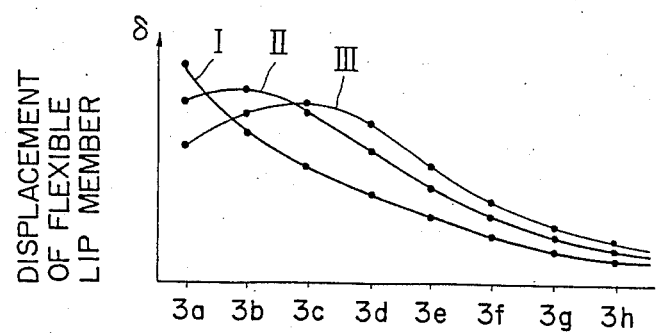
FIG. 2 is a graph showing curves representing displacement amount of a lip portion of the T-die shown in FIG. 1 when adjusting bolts are driven.
Figure 3:
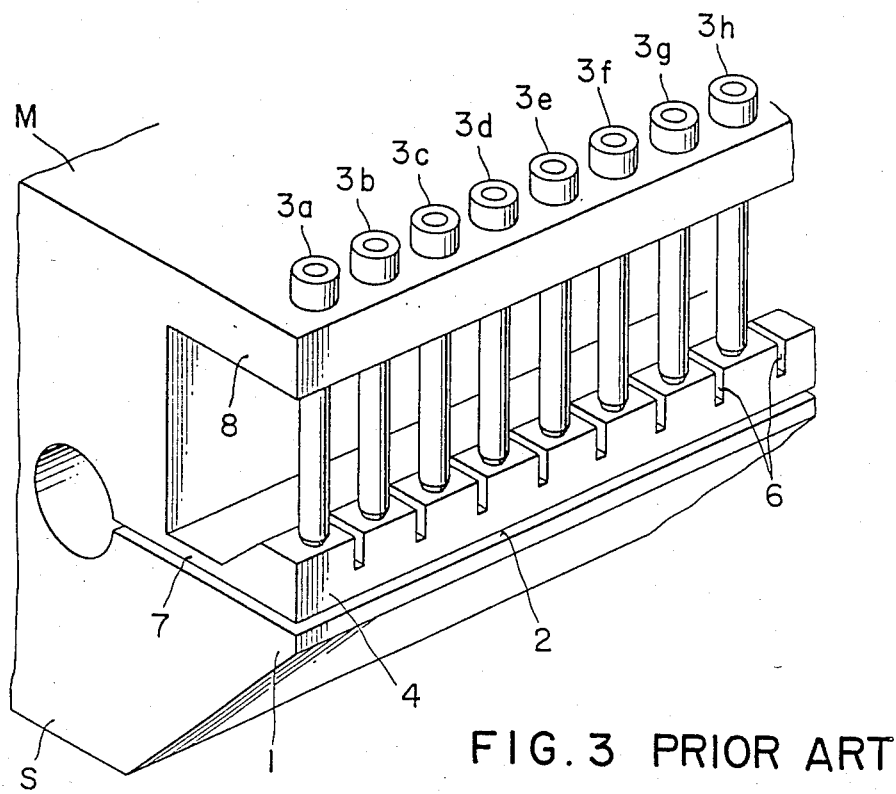
FIG. 3 is a view similar to FIG. 1 showing another type of conventional T-die.
Figure 4:
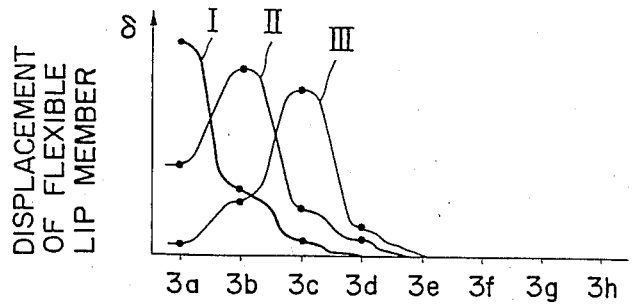
FIG. 4 is a graph similar to that shown in FIG. 2 with respect to the T-die of FIG. 3.
Figure 5:
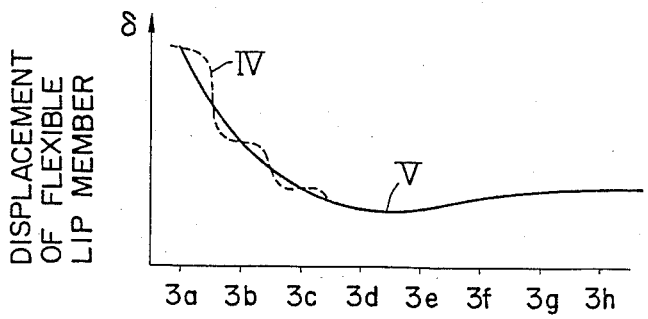
FIG. 5 is a graph showing an edge profile representing the operation continuity of the T-die shown in FIG. 1.
Figure 6:
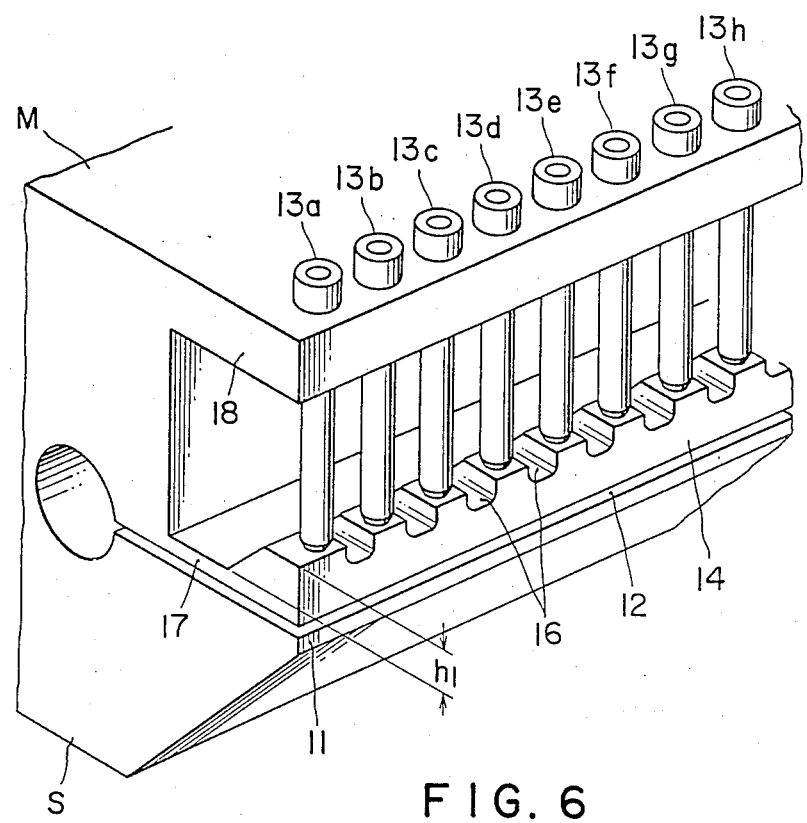
FIG. 6 is a perspective view showing a part of a T-die adapted for extrusion molding according to this invention.
Figure 7B:
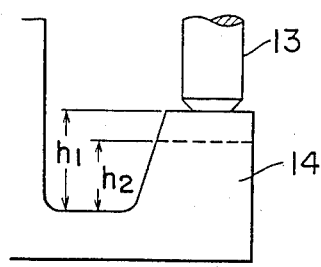
FIGS. 7A and 7B are front and side views showing one U-shaped groove of a flexible lip portion of the T-die shown in FIG. 6.
Figure 7A:
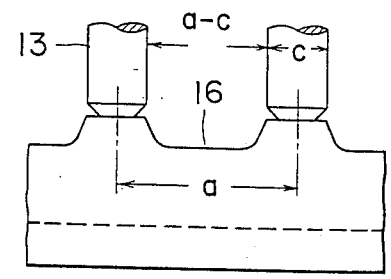

Referring to FIG. 6, a T-die comprises a lower stationary part S integrally provided with a steady lip portion 11 along a longitudinal length of the T-die and an upper movable part M integrally provided with a base portion as a neck portion 17 and a flexible lip portion 14 protruded from the neck portion 17 so as to provide a gap in a slit form through which plastic material is extruded between the steady lip portion 11 and the flexible lip portion 14. A plurality of adjusting bolts 13 (13a, 13b, . . . 13h) are adjustably secured, usually screwed, at one ends to the upper portion 18 of the movable part M so as to extend therefrom to cover the flexible lip portion 14 with space and spaced equally between respective two adjacent bolts so that the other ends, i.e. front ends, of the adjusting bolts 13 abut against and downwardly press the flexible lip portion 14 when the bolts are driven manually or automatically by known means to thereby displace the base portion 17 and adjust the width of the gap 12. A plurality of U-shaped grooves 16 are formed in the flexible lip portion 14 so that one groove 16 is positioned between the adjacent two bolts 13. In the illustrated embodiment, the groove 16 is provided with an opening portion having a width substantially equal to the distance (a-c) between the adjacent two adjusting bolts 13, in which a letter a is a distance between the central axes of the adjacent two bolts 13 and a letter c is a diameter of one bolt 13 as shown in FIG. 7A, and the groove 16 has a depth $(h_1-h_2)$, as shown in FIG. 7B, in which a letter $h_1$ is a distance between the upper portion of the flexible lip 14 and the neck portion 17, i.e. the height of the flexible lip portion 14, and a letter $h_2$ is a distance between the bottom of the groove 16 and the neck portion 17.

In experiments, it was found that the ratio $h_2/h_1$ and the width (a-c) significantly affect the aforementioned characteristics of the continuity and the operation flexibility of the T-die for the extrusion molding.

Figure 8:
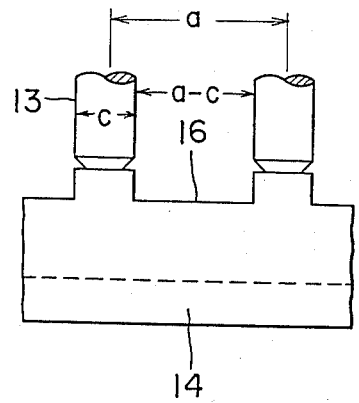
FIG. 8 is a front view similar to that shown in FIG. 7A of another example of a groove having rectangular cross section.
Figure 9:
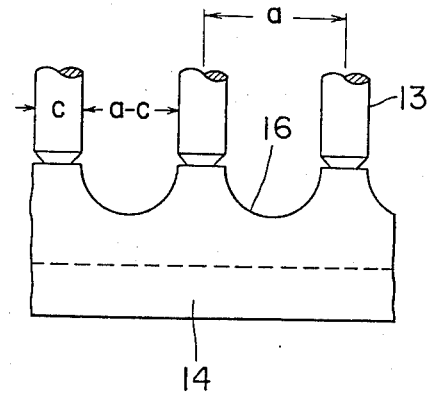
FIG. 9 is also a front view similar to that shown in FIG. 7A of a further example of a groove having arcuate cross section.

FIGS. 8 and 9 show preferred patterns of the U-shaped groove of the flexible lip portion of the T-die according to this invention, in which the groove 16 of FIG. 8 has a substantially rectangular cross section and the width of the opening portion is formed to have the length (a-c) equal to the distance between two adjacent bolts 13, and the groove 16 of FIG. 9 has a substantially arcuate cross section and the width of the opening portion is also formed to have the length (a-c).

Figure 10:
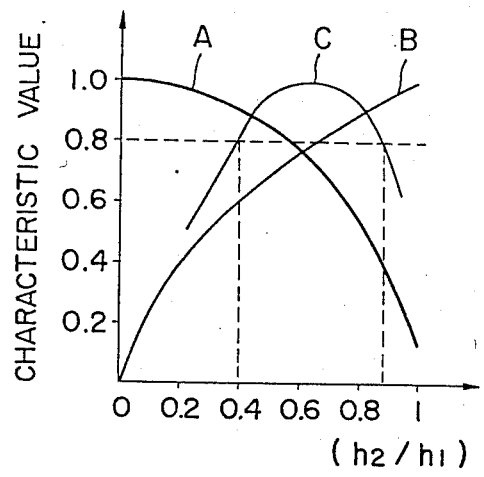
FIGS. 10 and 11 are graphs for showing total characteristic features regarding continuity and operation flexibility of flexible lip portions of T-dies provided with grooves shown in FIGS. 8 and 9, respectively.

FIG. 10 shows a graph of the characteristic curves A, B and C regarding the continuity and the operation freedom or flexibility with respect to the ratio $h_2/h_1$ in case of the T-die shown in FIG. 8. Referring to the graph, the curve A represents the operation flexibility, i.e. the mutual interference characteristics between the adjusting bolts when driven, and the curve A reveals the fact that the operation flexibility is improved when the ratio $h_2/h_1$ becomes small, that is; when the distance $h_2$ is short, and on the other hand, the curve B representing the continuity characteristic reveals the fact that the continuity is improved when the ratio $h_2/h_1$ becomes large, that is; when the distance $h_2$ is long. In view of the curves A and B, the total characteristic will be represented by the curve C, and in case that the total characteristic value over 0.8 is deemed to be desired, the preferred value of the ratio $h_2/h_1$ resides in the range $0.4 < h_2/h_1 < 0.85$ (with the peak point at the value of 0.6).

Figure 11:
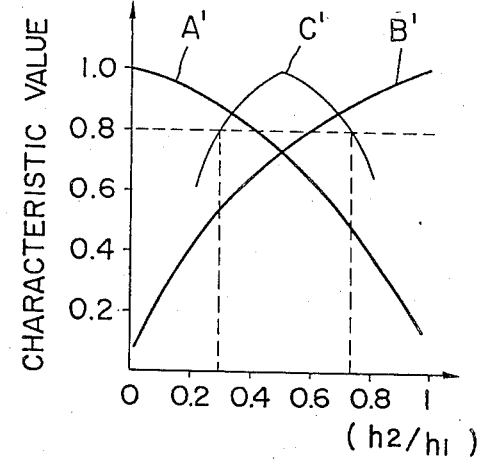

FIG. 11 shows a graph of characteristic curves A', B' and C' regarding the continuity and the operation freedom or flexibility with respect to the ratio $h_2/h_1$ in case of the T-die shown in FIG. 9. the curves A', B' and C' mean the same contents as those represented by the curves A, B and C, respectively, mentioned hereinbefore, and in case that the total characteristic value over 0.8 is deemed to be desired, the preferred value of the ratio $h_2/h_1$ resides in the range $0.3 < h_2/h_1 < 0.75$ (with the peak point at the value of 0.5).

In another experiment, it was found that the operation freedom or flexibility is approximately proportional to the width of the opening portion of the groove and the variation of the width of the groove hardly affects the continuity of the mutual interference effect of the adjusting bolts. Accordingly, a T-die provided with the groove opening having the most wide width substantially equal to the distance between the adjacent two adjusting bolts will be considered as the most preferred embodiment.

What is claimed is:

1. A T-die adapted for an extrusion molding of a plastic material constituted by a lower stationary half and an upper movable half provided with a base portion, comprising:
   a steady lip member integrally formed with said stationary half along a longitudinal length of the T-die;
   a flexible lip member formed integrally with the base portion so as to protrude therefrom along the longitudinal direction of the T-die so as to form a gap in a slit form between said steady lip member and said flexible lip member;
   a projecting member integrally formed with the upper portion of said movable half and extending to a position above said flexible lip member; and
   a plurality of parallel adjusting bolts rotatably secured at one end of each to said projecting member and spaced equally along the longitudinal direction of the T-die, each of said adjusting bolts having such a length that the other end of the adjusting bolt reaches the flexible lip member and presses the same downwardly when said bolt is driven in rotation,
   said flexible lip member being provided with a plurality of grooves each disposed between a respective pair of two adjacent bolts and having a substantially rectangular cross section of a width (a-c) in which a is the distance between the centerlines of two adjacent bolts and c is the diameter of one bolt, and a depth ($h_1-h_2$) in which $h_1$ is the height of the flexible lip member protruding from the base portion and $h_2$ is the distance between the base portion and the bottom of said groove, wherein the following relation exists between the height $h_1$ and the distance $h_2$, $0.4 < h_2/h_1 < 0.85.$ 2. A T-die adapted for an extrusion molding of a plastic material constituted by a lower stationary half and an upper movable half provided with a base portion, comprising:
   a steady lip member integrally formed with said stationary half along a longitudinal length of the T-die;
   a flexible lip member formed integrally with the base portion so as to protrude therefrom along the longitudinal direction of the T-die so as to form a gap in a slit form between said steady lip member and said flexible lip member;
   a projecting member integrally formed with the upper portion of said movable half and extending to a position above said flexible lip member; and
   a projecting member integrally formed with the upper portion of said movable half and extending to a position above said flexible lip member; and
   a plurality of parallel adjusting bolts rotatably secured at one end of each of said projecting member and spaced equally along the longitudinal direction of the T-die, each of said adjusting bolts having such a length that the other end of the adjusting bolt reaches the flexible lip member and presses the same downwardly when said bolt is driven in rotation,
   said flexible lip member being provided with a plurality of grooves each disposed between a respective pair of two adjacent bolts and having a substantially arcuate cross section of a width (a-c) in which a is the distance between the centerline of two adjacent bolts and c is the diameter of one bolt, and a depth ($h_1-h_2$) in which $h_1$ is the height of the flexible lip member protruding from the base portion and $h_2$ is the distance between the base portion and the bottom of said groove, wherein the following relation exists between the height $h_1$ and the distance $h_2$, $0.3 < h_2/h_1 < 0.75.$

* * * * *